A. D. SHILAND.
CHART FOR DETERMINING EXPOSURES.
APPLICATION FILED SEPT. 7, 1915.
1,171,548.  Patented Feb. 15, 1916.
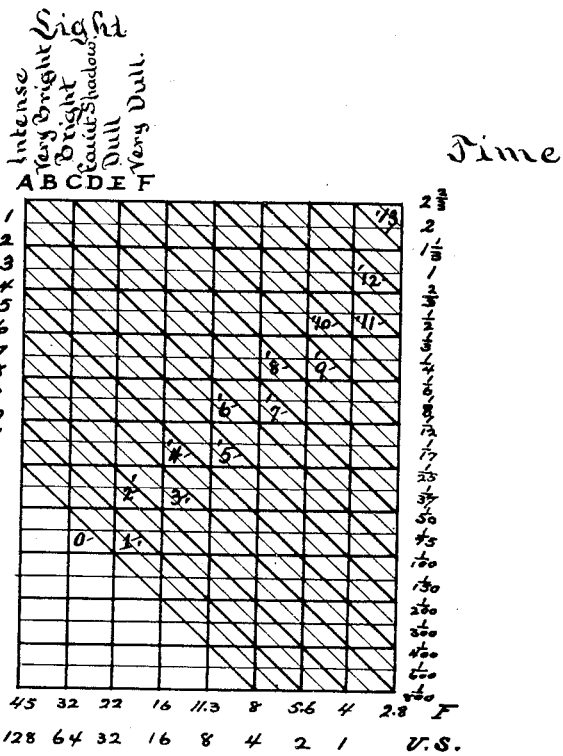

UNITED STATES PATENT OFFICE.

ARTHUR D. SHILAND, OF CLEVELAND, OHIO.

CHART FOR DETERMINING EXPOSURES.

1,171,548.  Specification of Letters Patent.  Patented Feb. 15, 1916.

Application filed September 7, 1915.  Serial No. 49,277.

*To all whom it may concern:*

Be it known that I, ARTHUR D. SHILAND, a citizen of the United States, and a resident of Cleveland, in the county of Cuyahoga and State of Ohio, have invented certain new and useful Improvements in Charts for Determining Exposures, of which I hereby declare the following to be a full, clear, and exact description, such as will enable others skilled in the art to which it appertains to make and use the same.

The invention relates to means for ascertaining the proper position of the diaphragm in a photographic camera and the amount of time of exposure of the sensitized plate or film to the light while taking a photograph.

The objects of the invention are to provide a simple and efficient form of exposure chart or scale suitable to the use of amateurs and by means of which the correct amount of time for exposing a sensitized plate or film to the light can be ascertained at a glance for any condition or degree of intensity of the light values, and for any characteristic of the subject and its proximity to the operator, and also the amount of opening of the diaphragm for any character or subject and condition of light values.

The invention comprises a chart or scale for ascertaining the above enumerated features and includes, series of spaced horizontal and vertical lines crossing each other upon the chart and providing positions corresponding with which are placed the indicating names of graduated values of light corresponding with peculiar characteristics of the subject and vice versa, which are read upon adjacent sides of the chart, and includes also similarly indicated graduated relative values of time to the amount of diaphragm opening, and which are placed upon opposite adjacent sides of the chart. By means of diagonals intersecting with the intersecting points of the aforesaid lines and dividing them into as many parts as may be required, the proper relative values of time of exposure and amounts of diaphragm opening can be ascertained when the relative values of light and characteristic qualities of the subject are known.

The invention further includes means for determining the proper relative combinations to be read upon the scale or chart for varying angles of inclination of the sun above the horizon during the day.

Further means are provided for indicating the manner of reading the chart or scale for varying rates of speed capability of the sensitized plate or film used at any time. The chart indicating a fixed or normal condition for plates or films capable of being affected at ordinary speeds, also a means is provided for modifying the reading to obtain correct values of time of exposure for varying periods of the year.

The invention includes the features of novelty and utility hereinafter described, shown in the accompanying drawings and specifically pointed out in the claims.

In the accompanying drawings the figure illustrates by means of a printed scale the features and manner of arrangement of the several values for immediate comparison.

In the drawing a chart is formed of vertical lines X, X and horizontal lines y, y, intersecting therewith, separating the body of the chart into horizontal and perpendicular spaces and these spaces are intersected by diagonal lines Z, Z, crossing the intersecting points of the horizontal vertical lines. Upon the left side of the figure thus formed are disclosed graded subject characteristics and numbered 1 to 11 inclusive, arranged opposite horizontal lines, such as the following:

| | | |
|---|---|---|
| Portraits | In dark shade | 1 |
| | Light shade | 2 |
| Close views | In shade | 3 |
| | Average condition | 4 |
| | All light | 5 |
| Landscape near or average distance | Dark | 6 |
| | Light | 7 |
| Distant landscape | Dark | 8 |
| | Light | 9 |
| Seashore or snow | | 10 |
| Distant sea and clouds | | 11 |

The names of the graduations of light to be used in connection with the foregoing described subjects are indicated opposite the vertical lines at the top of the chart in graduated order, as follows:

A Intense
B Very bright
C Bright
D Faint shadow
E Dull
F Very dull

The amount of opening for the diaphragm in relation to time is distinguished at the bottom of the chart opposite the vertical lines in parts of U. S. standard and the focal system at U. S. and F respectively, in divisions of the focal length of the lens, F.

45—32—22—16—11.3—8—5.6—4—2.8—U. S. 128—32—16—8—4—2—1; and the length of time exposure is indicated at the right of the chart in seconds and fractions thereof opposite the horizontal lines as 2 2/3—2—1/3—1—2/3—1/2—1/3—1/4—1/6—1/8—1/12—1/17—1/25—1/37—1/50—1/75—1/100, etc.

In employing this chart the characteristics of subject and light are first considered as indicated upon the diagram or chart. For instance, if a dark landscape is to be photographed upon a bright day, the procedure is as follows: Following the horizontal line opposite the words "Dark landscape" (6) on the chart, it is followed until it intersects with the vertical line C opposite the word "Bright" for a corresponding light value. At this intersection the diagonal line 4 will be found and this diagonal line will be the index for exposure value. After the diagonal line 4 is found and if a time of exposure of 1/25 of a second is desired to be used, the diagonal line is followed until it intersects with the horizontal line opposite 1/25 in the time column, and the vertical line intersecting at the same point is followed downward to 8 U. S. in the column of diaphragm openings and will indicate that 8 U. S. standard is the amount of opening required in the diaphragm and the camera adjustments are accordingly set therefor. In this manner when the subject and light are given the amount of opening for the diaphragm can be obtained for any time of exposure desired, or if the amount of diaphragm opening is predetermined at U. S. 4 the time of exposure can be determined by following the vertical line upward till it intersects with the diagonal line 4, and then following the horizontal line intersecting therewith and the time of exposure for that amount of opening will be found to be 1/50 of a second.

The modifications for reading the chart at the various degrees of inclination of the sun may be indicated by adding a number or fraction to the index number of the ascertained diagonal line. That is, if the time should be late in the day or early in the morning, in the example given the numeral 1 should be added to 4 and the number of the diagonal line to be followed will be 5 to obtain correct time exposure and amount of diaphragm opening. A separate diagram may be made on the chart to show the changes for sun elevation above the horizon, as at W. For a speedy or fast plate a fraction as 1/2 can be subtracted from the numeral of the determined diagonal line and for a slow plate a fraction as 1/2 can be added to the numeral of the diagonal line. For the several calendar months of the year numerals can be added to advance the diagonal line to correspond with reduced light values.

This scale will read directly for substantially all photographs taken in outdoor work by amateurs without the use of the correcting features.

Having described the invention what I claim as new and desire to secure by Letters Patent is:

1. In a chart for determining the time of exposure and amount of opening of the diaphragm, of a camera shutter, a series of subject characteristics and horizontal lines, coinciding respectively therewith, and a series of light values and vertical lines coinciding respectively therewith and intersecting said horizontal lines, in combination with a series of time values corresponding respectively with the horizontal lines and a series of widths of diaphragm openings corresponding respectively with said vertical lines, and parallel diagonal lines intersecting with the intersections of the horizontal and vertical lines for determining the correct time values relative to amounts of diaphragm opening when considered with predetermined subject matter and sight conditions specified upon the horizontal and vertical lines.

2. In a chart for determining the time of exposure and amount of diaphragm opening to be used with predetermined subject matter and light condition, a series of horizontal lines coinciding respectively with the description of subject matter, a series of vertical lines coinciding respectively with the description of light conditions, and a series of parallel diagonal lines intersecting the intersections of said vertical and horizontal lines, and a series of time values coinciding with said horizontal lines and a series of amounts of diaphragm opening corresponding with said vertical lines, each diagonal line being followed to its intersection with the horizontal line corresponding with the desired time of exposure, and thence the vertical line intersecting therewith and with said horizontal line being followed to one of the series of amounts of diaphragm openings.

In testimony whereof, I hereunto set my hand this 26th day of Aug. 1915.

ARTHUR D. SHILAND.

In presence of—
RALPH W. JEREMIAH,
WM. M. MONROE.